United States Patent [19]

Moody et al.

[11] Patent Number: 5,236,250

[45] Date of Patent: Aug. 17, 1993

[54] FULL-FUNCTION VALVE FOR HEAVY DUTY SEMI-TRAILER BRAKE SYSTEMS

[75] Inventors: Michael J. Moody, Smithville; Robert L. Koelzer, Kearney, both of Mo.

[73] Assignee: Midland Brake, Inc., Kansas City, Mo.

[21] Appl. No.: 939,141

[22] Filed: Sep. 2, 1992

[51] Int. Cl.$^5$ ............................................. B60T 13/00
[52] U.S. Cl. ......................................... 303/7; 303/9.76; 303/9; 303/28; 303/71
[58] Field of Search ................. 303/7, 9, 13, 71, 9.76, 303/28–30, 40; 188/170

[56] References Cited

U.S. PATENT DOCUMENTS 4,080,004 3/1978 Ury ........................................ 303/9
4,915,456 4/1990 Gross et al. ............................ 303/9

Primary Examiner—Douglas C. Butler
Attorney, Agent, or Firm—Leydig, Voit & Mayer

[57] ABSTRACT

Within a single envelope or housing, this full-function valve integrates all of the emergency and service requirements of a tandem axle air brake system for heavy duty truck semi-trailers, thereby decreasing complexity and cost and enhancing safety, reliability and operating capability while also satisfying applicable Federal Regulations. The housing encloses a spring brake valve module, a relay valve module and a biased one-way pressure protection valve, all interconnected to meet operating requirements, while preventing non-intentional spring brake engagement, foreclosing trailer movement without adequate service brake capability and optionally providing anti-compounding protection.

15 Claims, 16 Drawing Sheets

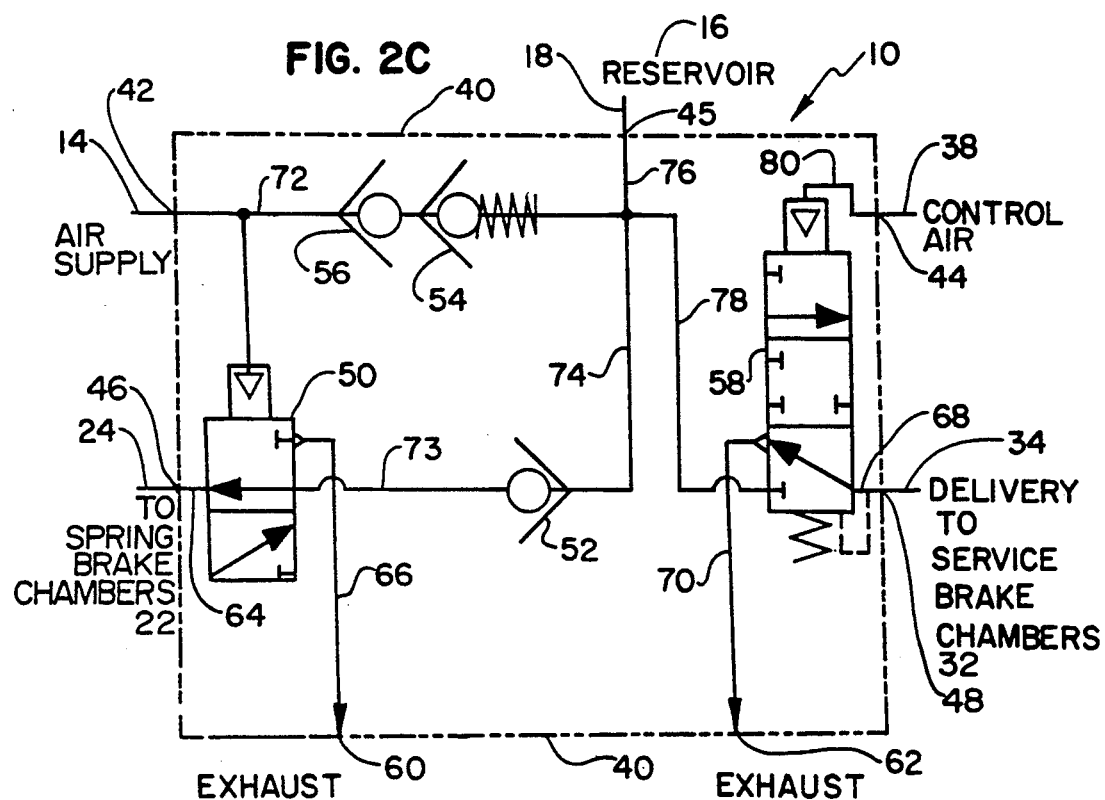
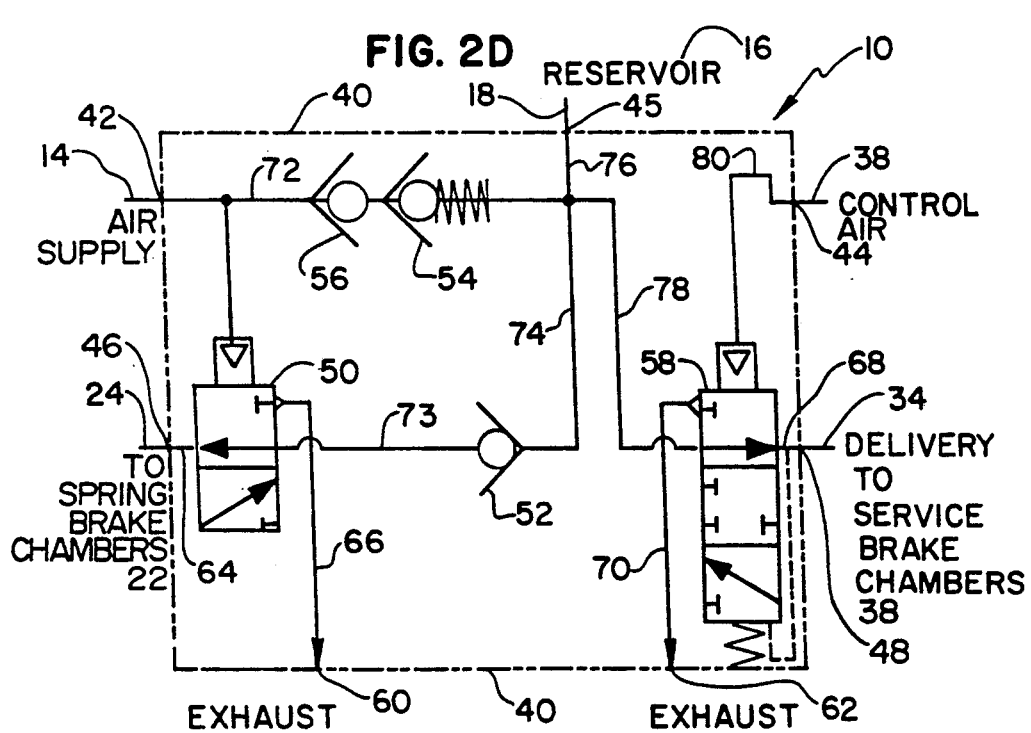

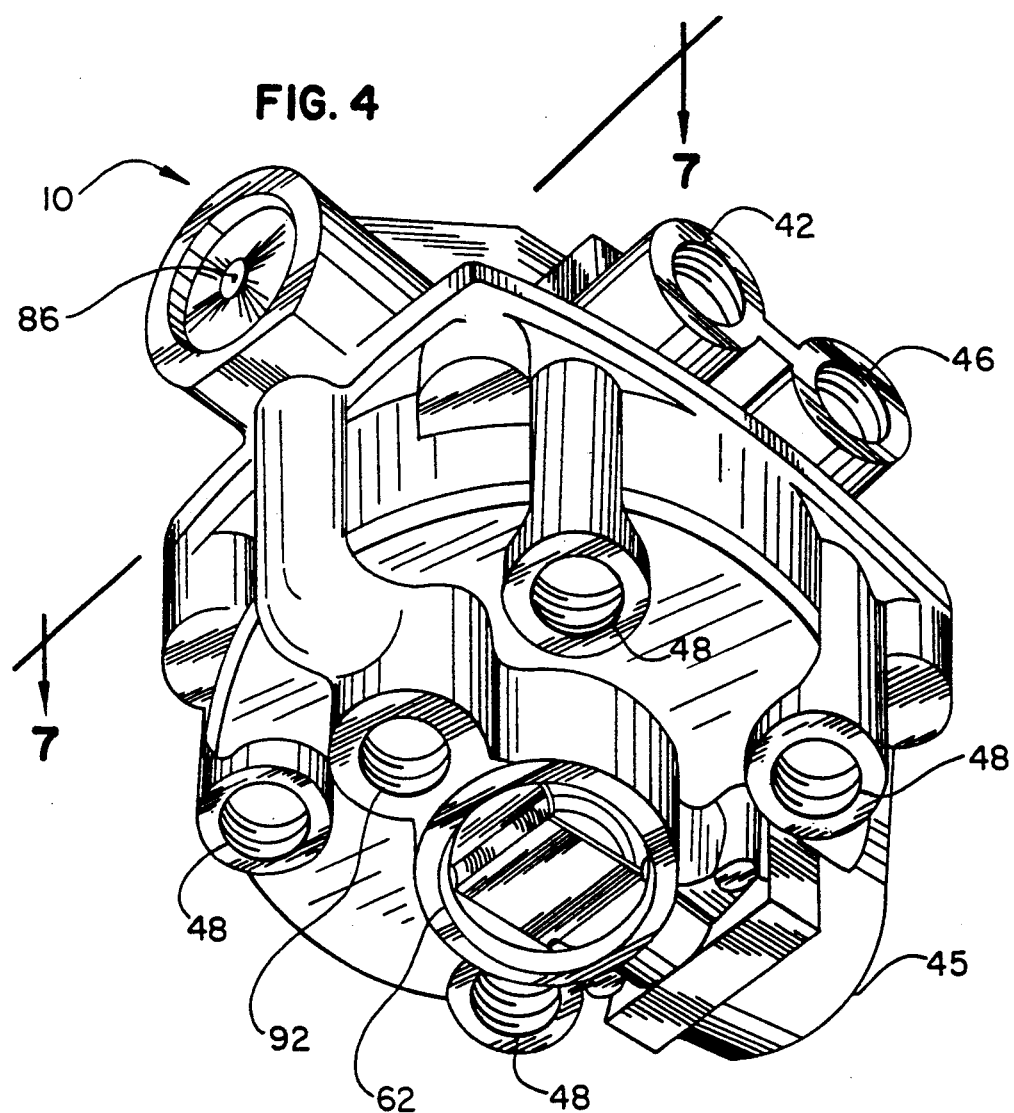

FULL-FUNCTION VALVE FOR HEAVY DUTY SEMI-TRAILER BRAKE SYSTEMS

BACKGROUND OF THE INVENTION

1. Field of the Invention

This invention relates to an improved full-function brake valve for use in fluid pressure braking systems primarily employed on the semi-trailers of heavy-duty highway tractor-trailer vehicle combinations. More specifically, it relates to a full-function brake valve which combines the functions of, and replaces, multiple separate brake valves on highway semi-trailers, including tandem axle semi-trailers, with concomitant advantages.

2. Discussion of the Prior Art

To meet all of the emergency and service requirements of modern heavy-duty highway tractor-trailer combinations, while meeting all of the pertinent governmental regulations, including Federal Regulation FMVSS 121 (Docket 90-3, Notice 2), the trucking industry has resorted to a number of semi-trailer brake valve arrangements which have led complexity, high costs, installation and maintenance difficulties and related problems. These valve arrangements include multiple valves with multiple complex inter-connections, all designed to carry out multiple requisite brake functions.

As an example of one feature of such multiple installations, a pressure protection valve may be employed on the semi-trailer to maintain pressure in the air supply line from the tractor to the semi-trailer in the event that the pressurized air reservoir (tank) on the semi-trailer fails. As a related example, a one-way check valve arrangement may be employed on the semi-trailer to prevent venting of the pressurized air in the semi-trailer reservoir through the air supply line from the tractor.

As another example, a spring-brake control valve may be employed in the semi-trailer braking system to control the supply of pressurized air to the spring brakes to release them and also to exhaust air therefrom when the spring brakes are to be again applied. The brake system, however, must be designed so that the spring brakes are not released prematurely, that is, prior to pressurization of the reservoir. Safety considerations dictate that the service brake function be enabled by such reservoir pressurization prior to release of the spring brakes.

As still another example, a separate one-way check valve may be employed to control or limit the flow of pressurized air from the spring brakes and the spring brake control valve in the event of a failure of the semi-trailer pressurized air reservoir. This one-way check valve prevents the premature application of the spring brakes in the event of such failure so that the semi-trailer can continue to be towed to a safe parking place.

In addition to all of the above, a semi-trailer braking system typically employs a multi-port relay valve to control the operation of the service brakes, that is, the valve supplies pressurized air to, maintains pressurized air in, and releases pressurized air from, the service brake chambers, pursuant to control signals received from the tractor. For such control purposes, a separate pressurized control line runs from the tractor to the relay valve on the semi-trailer.

Another feature which is desired in a modern braking system is anti-compounding brake force protection. This feature protects against the undesired simultaneous application of both service brake forces and spring brake forces under certain circumstances.

Manifestly, the various valve installations and interconnections to accomplish all of these functions on a modern tandem semi-trailer are complex, costly, difficult and inconvenient to install, troubleshoot, service and maintain and otherwise are undesirable from a parts inventory standpoint. Previous efforts to integrate the various valve requirements within a single envelope or housing have not resulted in brake systems meeting current requirements.

Illustrative of the prior art is Gross et al. U.S. Pat. No. 4,915,456 and patents cited therein, i.e., Ury U.S. Pat. Nos. 4,042,281, 4,080,004 and 4,163,585; Tannin U.S. Pat. No. 4,182,535; and Carton et al. U.S. Pat. Re. 30,205 (Reissue of U.S. Pat. No. 3,992,064. Still other illustrative prior art includes Fannin U.S. Pat. No. 4,472,007 and Campanini U.S. Pat. No. 4,593,954 and the patents cited therein. None of these patents disclose or suggest a complete full-function valve, all housed within a single envelope and meeting the current requirements provided by the present invention.

OBJECTS OF THE INVENTION

It is therefore a general object of the present invention to cope with the shortcomings of prior-art heavy-duty semi-trailer brake systems, including those having a plurality of individual valve envelopes with interconnecting hoses or lines, as well as those housed within a single envelope or housing.

It is another general object of the invention to provide within a single valve envelope an improved full-function brake valve for heavy-duty highway trailers which performs all of the various aforementioned functions and otherwise meets all of the requirements of the aforementioned Federal Regulation.

It is another general object to provide a full-function brake valve system for heavy-duty highway semi-trailers which is less complex, lower in cost and easier and more convenient to install, trouble-shoot, service and maintain It is another general object to provide a full-function valve system for heavy-duty highway semi-trailers which has fewer interconnecting fluid lines or hoses and other components but does the same job with greater safety.

It is another object to reduce the number of separate valves in a highway semi-trailer braking system and yet provide the requisite brake functions for safe operation including anti-compounding protection.

It is another object to provide a single, compact full-function brake valve which alone provides the requisite brake functions for a tandem axle semi-trailer as above set forth, including the safety feature of not releasing the spring brakes before enablement of the service brake function.

It is still another object to provide a "user-friendly" semi-trailer braking system meeting current requirements and having a single valve envelope to which all hoses or lines connect and thus fewer potential failure locations, greater ease of installation, servicing and field trouble-shooting, and reduced parts inventory requirements.

It is a specific object to provide a simplified highway semi-trailer brake system wherein the spring brakes cannot be released in the absence of adequate service brake capability, that is, an anti-drive-away feature.

It is another specific object to provide a lower-cost highway semi-trailer brake system wherein in the event of trailer air reservoir failure, rapid decay of air pressure in the spring brake chambers will be prevented, allowing the driver to pull the tractor-trailer off the road prior to spring brake application.

It is another specific object to provide, in addition to the above features, a highway semi-trailer brake system wherein in the event of semi-trailer air reservoir failure, the supply line from the tractor will be isolated from the failure whereby sufficient air pressure full service braking of the tractor will be maintained.

These and other objects of the present invention become apparent from the description hereinafter set forth.

SUMMARY OF THE INVENTION

These objects are achieved by a single, unitary, full-function valve on the semi-trailer comprising a full-function valve body with multiple ports, including individual ports for fluid communication to the spring brake chambers, to the service brake chambers, to the trailer pressurized air reservoir and to exhaust; and individual ports for receiving pressurized control and supply air from respective sources thereof. The various ports and related communicating passageways within the valve body are disposed so as to communicate the control air for service brake control and the supply air for selectively charging pressurized air to, and discharging pressurized air from, the trailer air reservoir and the spring brake and service brake chambers of the air brake system, all responsive to a plurality of valve modules also housed within the full-function valve body or envelope.

Among the valve modules housed within the full-function valve body is a spring brake valve module and associated check valve which together provide (i) fluid communication from one or more spring brake ports of the valve body to one or more exhaust ports when air pressure at the air inlet supply port is less than a first predetermined pressure, typically about 40 psig, and (ii) one-way fluid communication from the reservoir port of the valve body to the spring brake ports when the air pressure at the air inlet supply port is at or higher than the first predetermined pressure The full-function valve body also houses a relay valve module for actuating the service brakes responsive to control air signals, typically originating in the tractor and received at the control air port of the valve body. This module may be of conventional design as will be apparent hereinafter.

The full-function valve body also houses a biased pressure protection one-way valve module and associated one-way check valve and related communicating passageways. This pressure protection valve provides fluid communication from the air supply port to the reservoir port, to the spring brake valve module (via a second one-way check valve) and to the relay valve module when the air pressure at the inlet port is equal to or above a second higher predetermined air pressure, typically about 70 psig. The simultaneous pressurization of the reservoir and spring brake valve module assures that the spring brakes will not be released until pressure is available at the reservoir to actuate the service brakes.

As those skilled in the art will recognize, the aforementioned relay valve module within the full-function valve body will provide in a first mode, fluid communication between the service brake ports of the valve body and an exhaust port in response to decreasing pressure or zero pressure at the control air port. In a second mode, the relay valve module provides one-way fluid communication from the air supply port and fluid communication from the reservoir port to the service brake port in response to increasing pressure at the control air port. In a third mode, the relay valve module blocks fluid communication to and from the service brake port in response to a stabilized elevated pressure at the control air port.

To differentiate the pressurized air which fills the reservoir and actuates the spring and services brakes from the pressurized air which controls the relay valve module, the former is referred to herein as supply air, and the latter as control air. Similarly, the respective ports are referred to as the supply port and the control port or, alternatively, as the supply air port and the control air port. As those skilled in the art will recognize, supply air is sometimes termed emergency air, and control air is sometimes termed service air, terms not used herein.

Because most modern-day trailer brake systems employ pressurized air as the fluid medium for actuation and control purposes and such use is contemplated in the presently-known best-mode embodiment described herein, the disclosure herein set forth assumes such medium to be used. As those skilled in the art will recognize, however, the invention is not necessarily limited thereto and the inventive concept may be adapted to other fluid media.

BRIEF DESCRIPTION OF THE DRAWINGS

The present invention may be more clearly understood from the following description of a specific and preferred embodiment read in conjunction with the accompanying schematic and detailed drawings, wherein:

FIGS. 2A, 2B, 2C, 2E, 2E and 2F are functional schematics of the full-function valve of the present invention illustrating various functional modes of the valve during the charging of the brake system and subsequent braking cycles;

FIG. 4 is a similar full-scale perspective view of the preferred embodiment of FIG. 3 as seen from the opposite direction;

Figure 1:
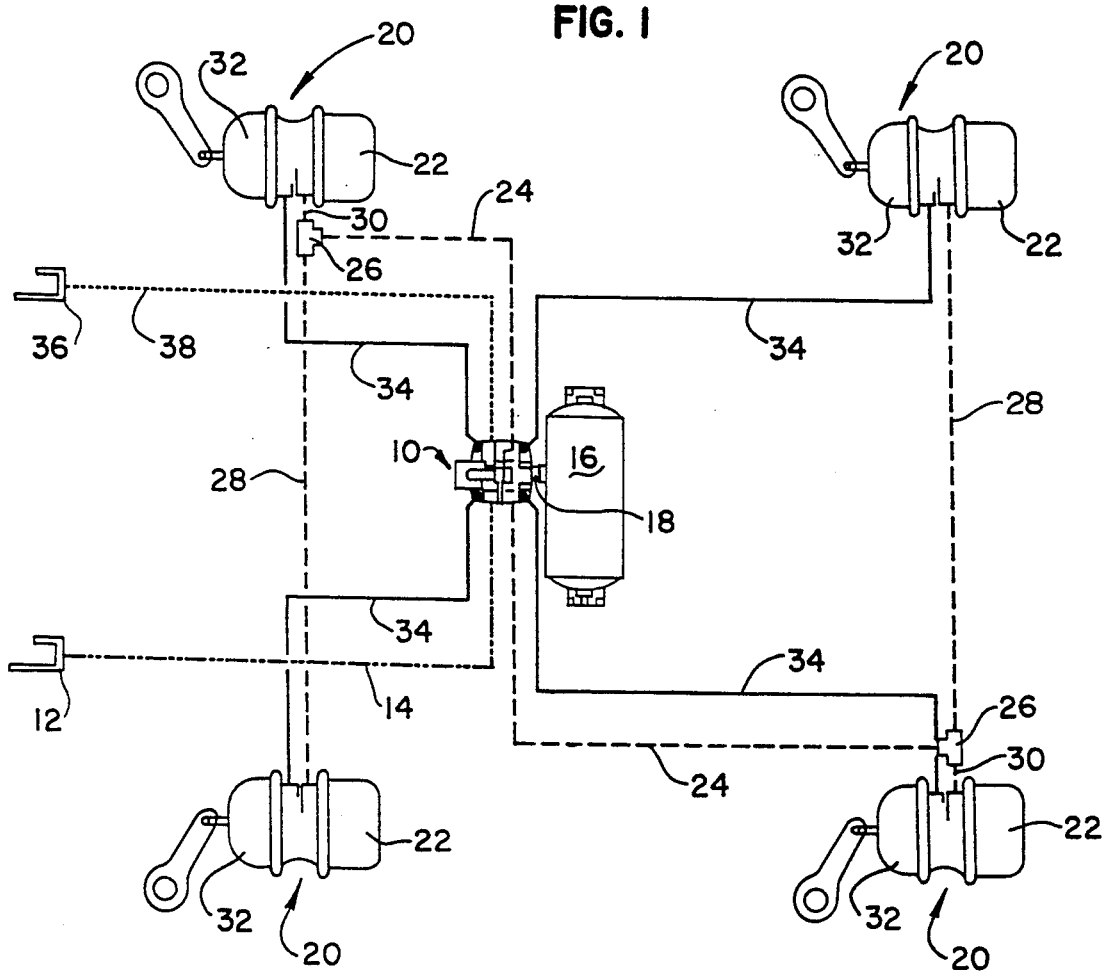
FIG. 1 is an overall schematic of a semi-trailer tandem brake system wherein the full-function valve of the present invention is advantageously employed.

It should be understood that the drawings are not necessarily to exact scale and that certain aspects of the embodiments, particularly the functional schematics of FIGS. 2A-2F, are illustrated by graphic symbols, schematic representations and fragmentary views. It should be also understood when referring to physical relationships of components by terms such as "upper", "lower", "upward", "downward", "vertical", "horizontal", "left", "right" or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shape path but also encompasses fluid communicating spaces, chambers and the like.

While much mechanical detail, including other plan and section views of the particular embodiment depicted have been omitted, such detail is not per se part of the present invention and is considered well within the comprehension of those skilled in the brake arts without further amplification in the light of the present disclosure. Moreover, details shown in certain views are sometimes omitted in other views as unnecessary and in the interest of simplicity.

It should be understood, of course, that the invention is not limited to the particular embodiment illustrated.

DETAILED DESCRIPTION OF DRAWINGS

Schematic of Tandem Brake System

FIG. 1

Referring to FIG. 1, the schematic represents a semi-trailer tandem brake system wherein the unitary full-function valve 10 of the present invention is advantageously employed. Pressurized supply air, typically at about 125 psig, is received into the system from a supply source (not shown) of the tractor-trailer combination via trailer gladhand connector 12 and is communicated to unitary full-function valve 10 via line 14.

As Will be described in detail, the pressurized air is directed by valve 10 to reservoir (tank) 16 via line 18. Pressurized air is also directed by full-function valve 10 to the dual chambers of brake actuators 20, the spring (parking) brake chambers 22 thereof being in fluid communication with full-function valve 10 via lines 24, T-couplings 26 and lines 28 and 30, and the service brake chambers 32 thereof being in fluid communication with full-function valve 10 via lines 34. Control air from the tractor for controlling the service brakes is received via gladhand 36 and communicated to full-function valve 10 via line 38.

Initially, upon charging of the brake system, the spring brake chambers 22 of brake actuators 20 and reservoir 16 receive pressurized air through full-function valve 10 directly from the source, i.e., the tractor (not shown) via gladhand connector 12 and line 14. Upon being fully charged, spring brake chambers 22 thereafter may be in fluid communication with reservoir 16 as well as the source, as will become apparent as the description proceeds. While shown as a single vessel or tank, reservoir 16 may take the form of a plurality of vessels in series or parallel, particularly if size and space limitations or configurations are factors.

In the following detailed descriptions of the schematics of full-function valve 10 in FIGS. 2A-2F and then of the actual valve itself in FIGS. 3, 4 and 5A-5F, the same reference numerals are used to the extent possible so that the respective descriptions can be more readily related and understood. Similarly, some of the reference numerals used in connection with FIG. 1 are carried over, although the relative positions of certain of the elements may be changed.

Schematics of Full-Function Valve

FIGS. 2A-2F

Figure 2A:
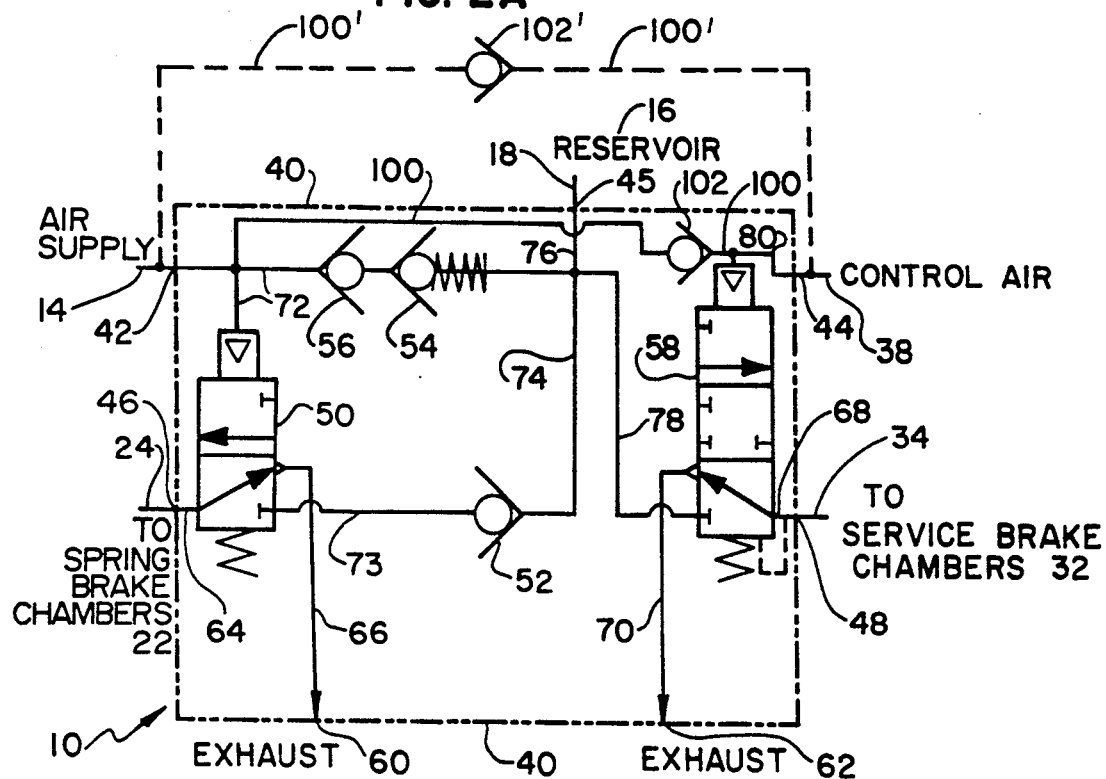

Referring to FIG. 2A, unitary full-function valve 10 is shown schematically at rest. Supply line 14, control line 38, reservoir line 18, spring brake chamber line 24 and service brake chamber line 34 are all at atmospheric pressure. Supply air line 14 is connected to housing or body 40 of full-function valve 10 at port 42. Control air line 38 is connected to valve body 40 at port 44. Line 18 to reservoir 16 is connected to valve body 40 at port 45. Line 24 to the spring brake chambers 22 is connected to valve body 40 at port 46. Line 34 to the service brake chambers 32 is connected to valve 40 at port 48.

Unitary full-function valve 10 houses within body 40 a plurality of valve modules, namely, spring brake valve module 50 and associated one-way check valve 52, biased one-way pressure protection valve module 54 with associated one-way check valve 56, and relay valve module 58. The exhaust outlet in body 40 from spring brake valve module 50 is depicted at 60. The exhaust outlet in body 40 from relay valve module 58 is depicted at 62.

In the at-rest position, spring brake line 24, which is attached to port 46 of valve body 40, is connected by internal passageway 64, spring brake valve module 50 and internal passageway 66 to exhaust port 60, whereby the spring brakes are fully applied. The service brake line 34, which is attached to port 48 of valve body 40, is connected by internal passageway 68, relay valve module 58 and internal passageway 70 to exhaust port 62.

Other elements shown in FIG. 1, including passageways 72, 74, 76, 78, 80 and the optional anti-compounding feature shown in both a solid-line embodiment and dashed-line embodiment, and comprising internal passageway 100 and one-way check valve 102, or, alternatively, the external counterparts 100[1] and 102[1], will be described hereinafter.

Figure 2B:
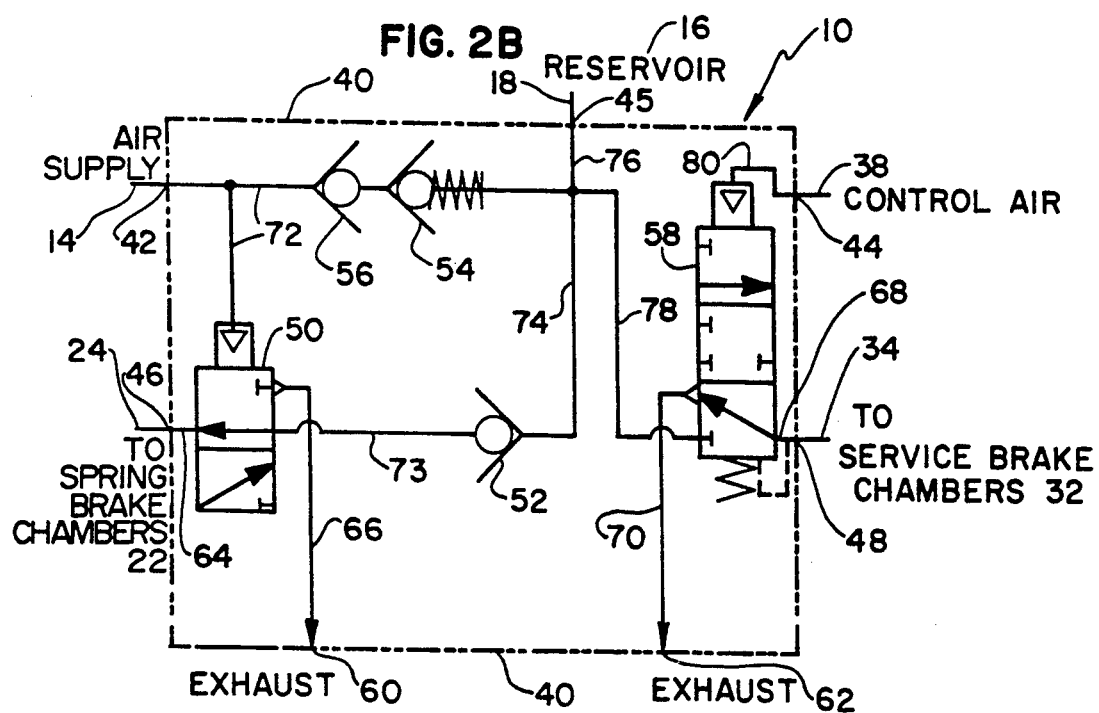

Schematic FIG. 2B shows full-function valve 10 after the pressure of the supply air in line 14, port 42 and internal passageways 72 has increased above a first predetermined pressure, typically about 40 psig, but is still below a second predetermined pressure, typically about 70 psig. In response to a pressure of at least about 40 psig in passageways 72 the piston of spring brake valve module 50 has shifted downwardly into the charging position.

Instead of being connected to the exhaust port, line 24, port 46, and internal passageway 64 are now connected via internal passageway 73 and one-way check valve 52 to internal passageway 74. Pressurized air, however, will not flow to the spring brakes via line 24 even though port 46 is now connected via passageway 64, module 50, passageway 73, check valve 52 and passageways 74 and 76 to port 45, line 18 and reservoir 16 because reservoir 16 is still at atmospheric pressure. The pressure in line 72 is not available because biased pressure protection valve module 54, which requires a pressure differential of about 70 psig to open, has not as yet opened.

While the ball of one-way check valve 56 is shown seated in FIG. 2B, it is initially momentarily unseated while the cavity between it and pressure protection valve module 54 is being pressurized to substantially that of passageway 72. It is unseated, of course, anytime that there is a pressure differential across it greater than that required to overcome the slight force of the usual spring (not shown) holding the ball in its seated position.

Schematic FIG. 2C shows full-function valve 10 with pressurized air in the supply line 14, port 42, and passageways 72 greater than the second predetermined pressure, typically about 70 psig. The biased one-way pressure protection valve module 54 and associated one-way check valve 56 are now open, and pressurized air is flowing into reservoir 16 via passageway 76, port 45 and line 18. Pressurized air is simultaneously flowing to the spring brake chambers via passageways 74, one-way check valve 52, which is now open to let the air through, passageway 73, spring brake valve module 50, passageway 64, port 46 and line 24.

The fact that the spring brake chambers 22 can not be pressurized prior to enablement of the service brake system by the simultaneous pressurization of reservoir 16 is an important safety feature which is absent from many prior art systems. In short, the spring brakes are not released until the pressure is available to actuate the service brakes. Otherwise, circumstances could develop whereby a trailer would have no effective braking.

When the air pressure in the spring brake chambers equals the supply air pressure, one-way check valve 52 will close, retaining the pressure in spring brake chambers 22. This will partially isolate the pressure in the spring brake chambers 22 from the variations in air pressure in the remainder of the trailer brake system. This will also prevent the pressurized air in the spring brake chambers 22 from escaping in the event of a failure of reservoir 16 or associated lines.

Schematic FIG. 2D shows full-function valve 10 when service brake control air is supplied via line 38, port 44 and passageway 80 to the piston of relay valve module 58, which may otherwise be of conventional design. As shown schematically, the module shifts and communicates pressurized air from reservoir 16 (and supply air under some circumstances) to the service brake chambers 32 via line 18, port 45, passageways 76 and 78, module 58, line 68, port 48 and line 34. This results in application of the trailer service brakes in a known manner.

Figure 2E:
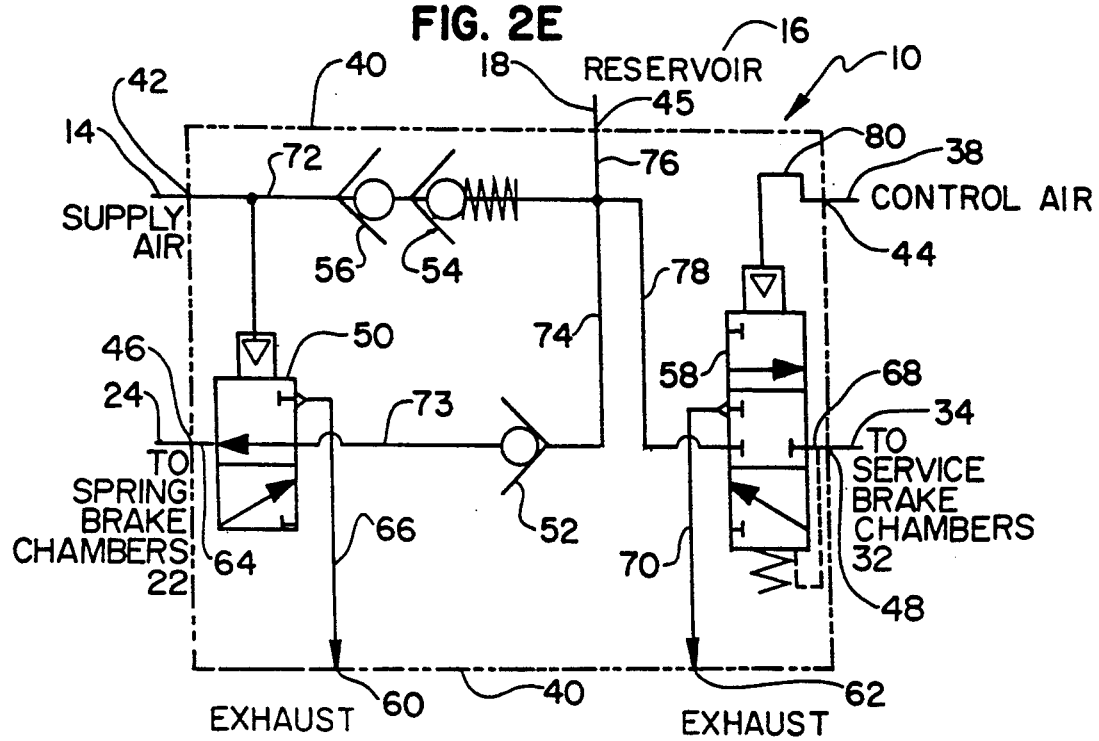

FIG. 2E depicts the situation when the pressure of the air in the service brake chambers 32 is substantially equal to the pressure of the control air supplied via line 38, port 44 and passageway 80. As those skilled in the art will recognize, this causes relay valve module 58 to shift to the so-called lap position. In this position, reservoir 16 and connecting passageways are isolated from the service brake chambers 32, and the service brake chambers 32 are also isolated from exhaust 62, a stabilized, brake-applied condition.

Figure 2F:
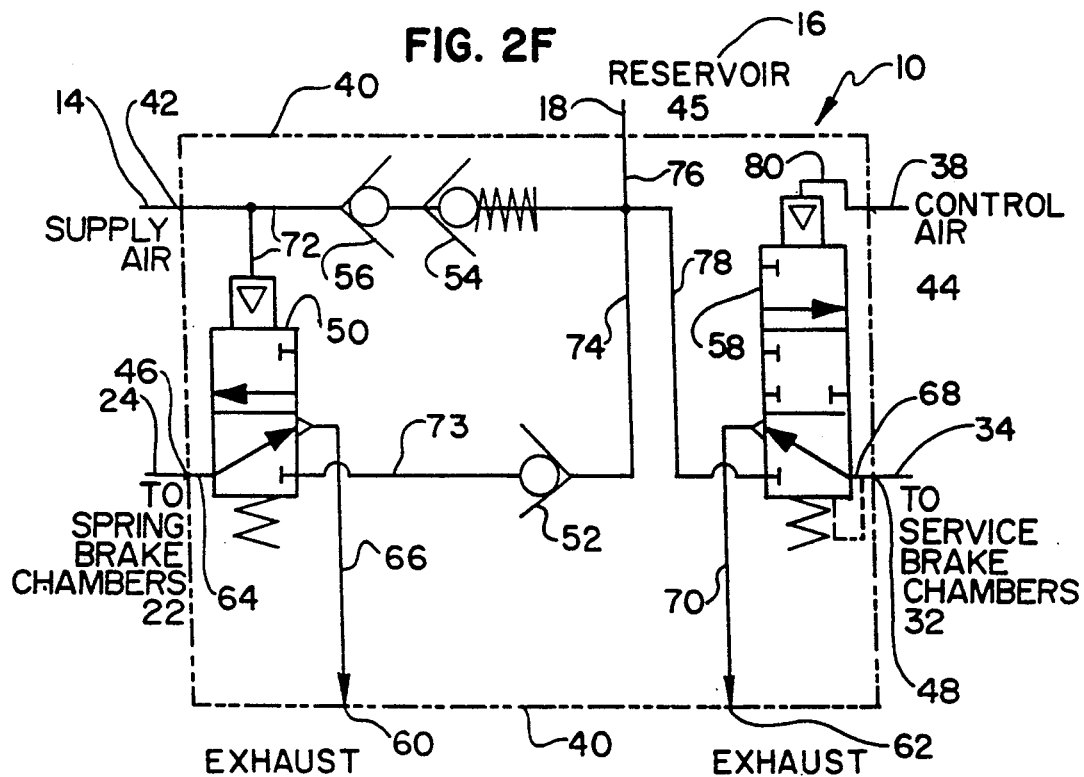

FIG. 2F schematically depicts full-function valve 10 when supply air from line 14 is evacuated or vacated. Complete evacuation would, of course, result in spring brake valve module 50 returning to its at-rest position, which releases pressurized air in the spring brake chambers 22 to exhaust 60. The spring brake valve module 50, however, will not shift to this exhaust position unless and until the supply air in line 72 is less than the first predetermined pressure of about 40 psig. This prevents the spring brakes 22 from applying prematurely in case of a failure in the supply line source.

The pressure protection one-way check valve 56 traps the pressurized air in the reservoir, preventing the air from escaping through port 42 and supply line 14. As will be apparent from FIG. 5F, pressure protection valve 54 remains open because the pressure trapped to the right of check valve 56 is above about 70 psig. The pressurized air thus trapped in reservoir 16 will be available to release the spring brakes the next time supply air of at least the first predetermined pressure of about 40 psig is available to the trailer.

Preferred Embodiment of Full-Function Valve

FIGS. 3–7

The preferred embodiment of the full-function valve of the present invention presented in FIGS. 3–7 is best understood with reference to the schematic diagrams of FIGS. 1 and 2 already discussed. For this reason, the same reference numbers are employed to the extent feasible.

Figure 3:
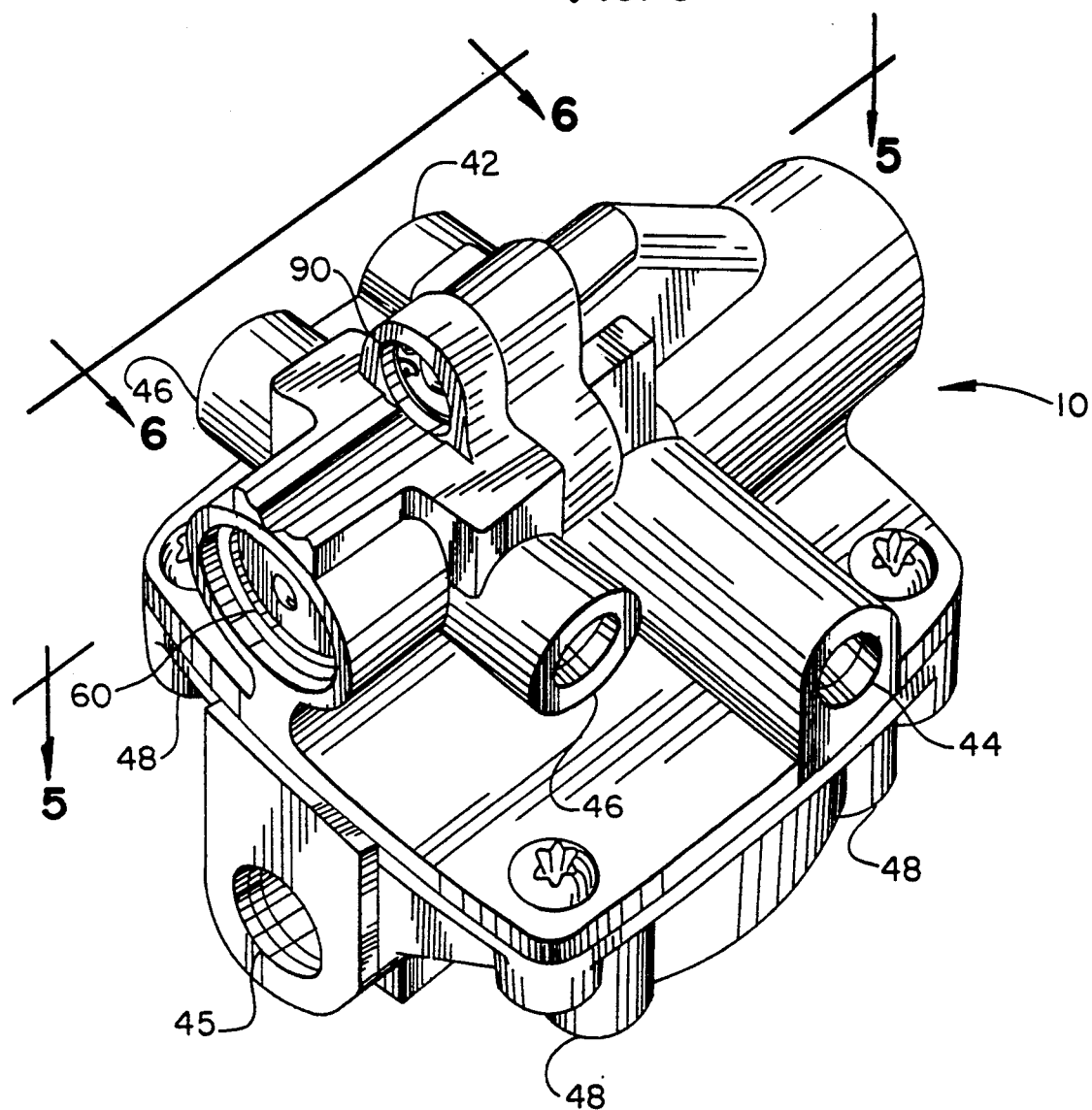
FIG. 3 is a full-scale perspective view of the exterior of a preferred embodiment of the full-function valve of the present invention.
Figure 5A:
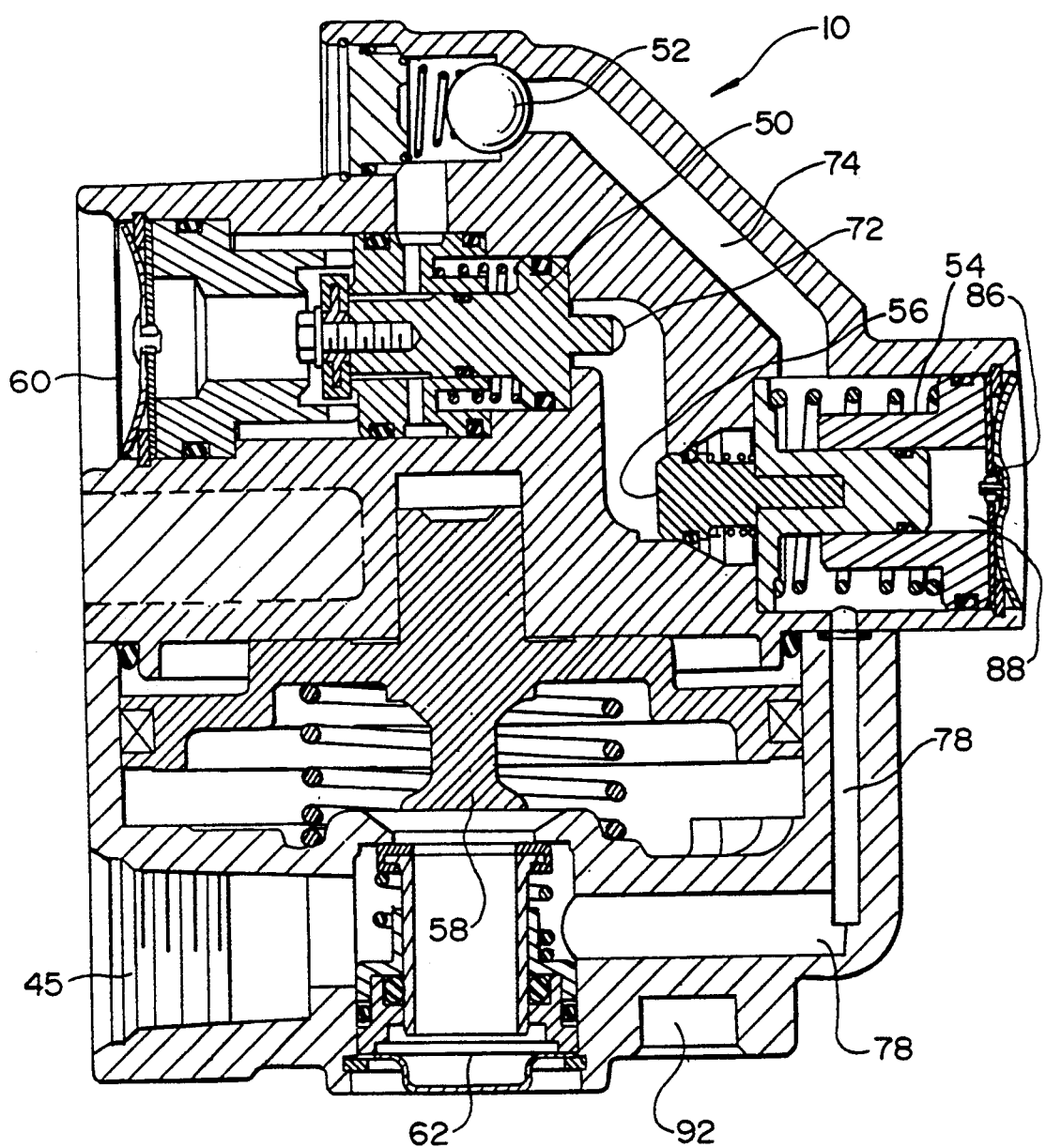
FIGS. 5A, 5B, 5C, 5D, 5E and 5F are sectional views taken along the section line 5—5 of FIG. 3 and show the positions of internal mechanical components corresponding to the functional modes schematically illustrated in FIGS. 2A-2F, respectively.
Figure 5B:
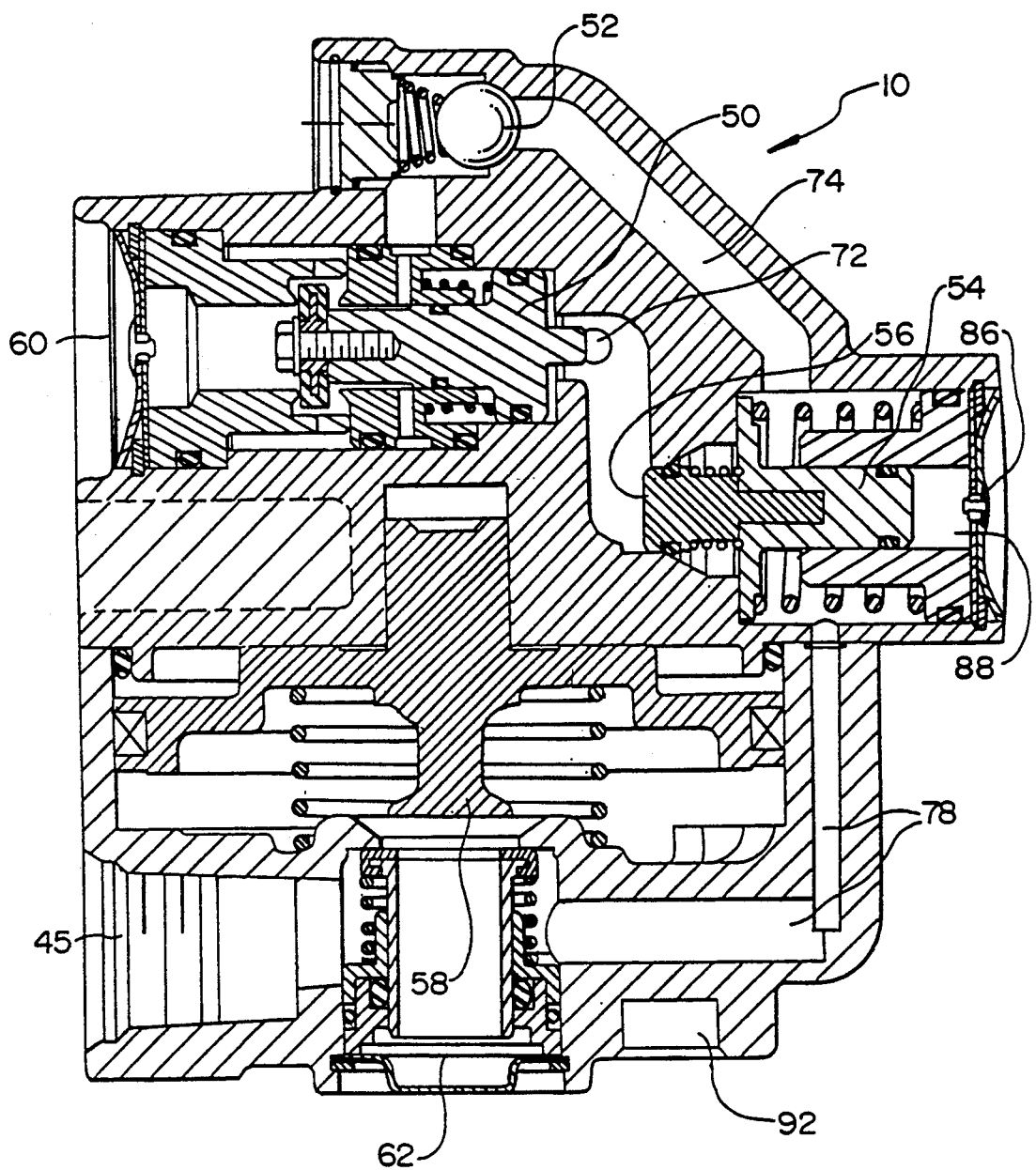
Figure 5C:
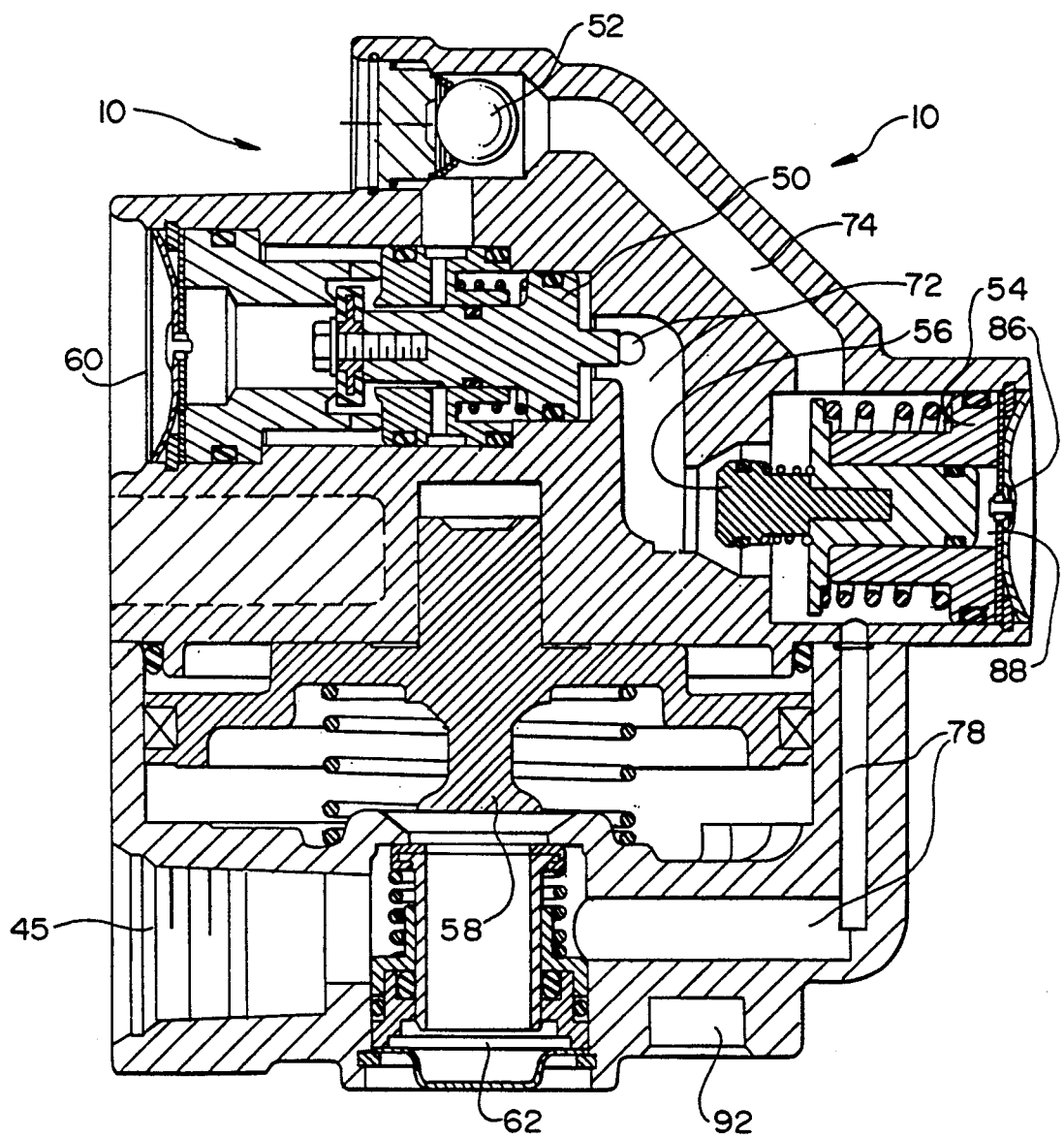
Figure 5D:
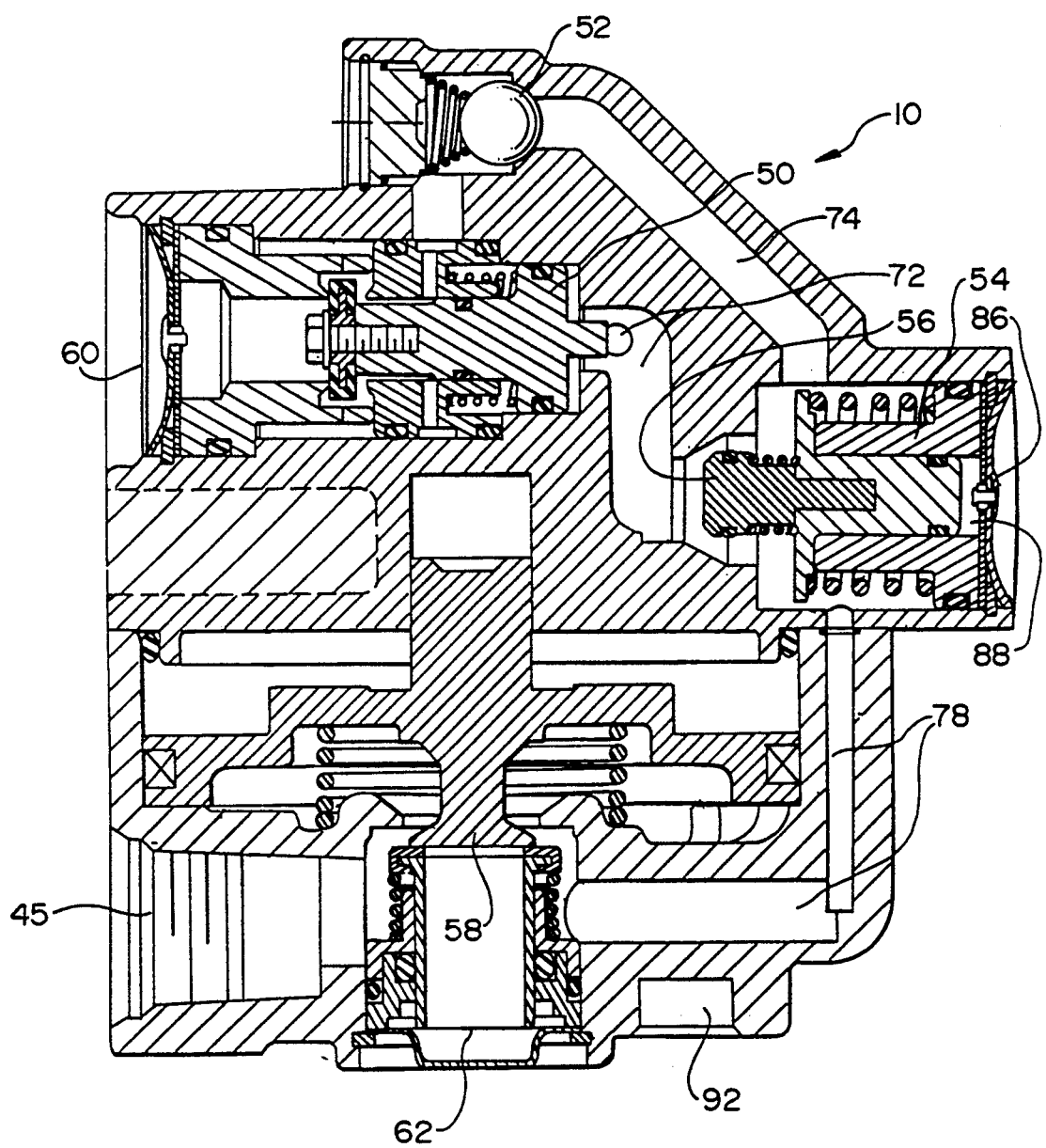
Figure 5E:
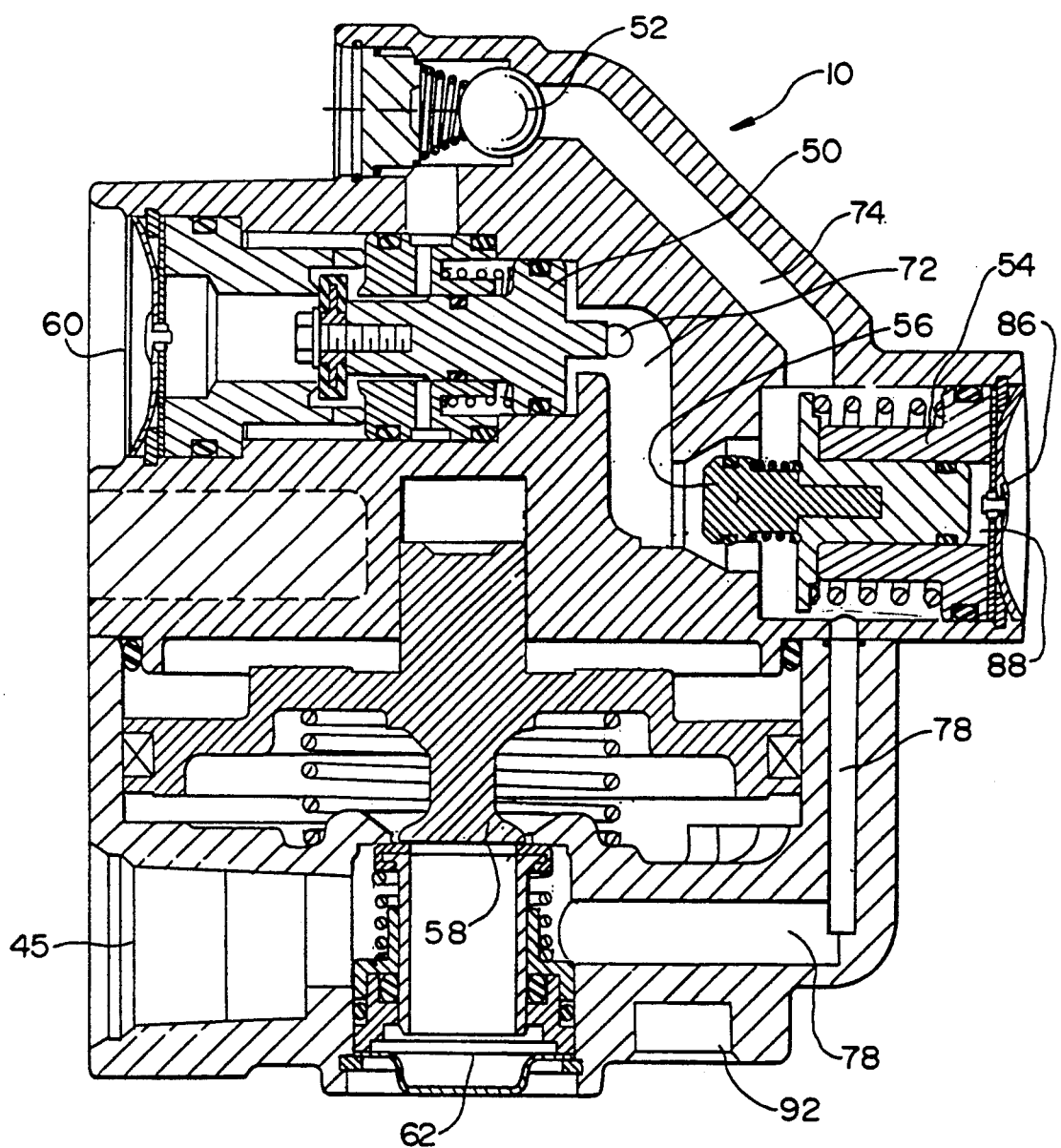
Figure 5F:
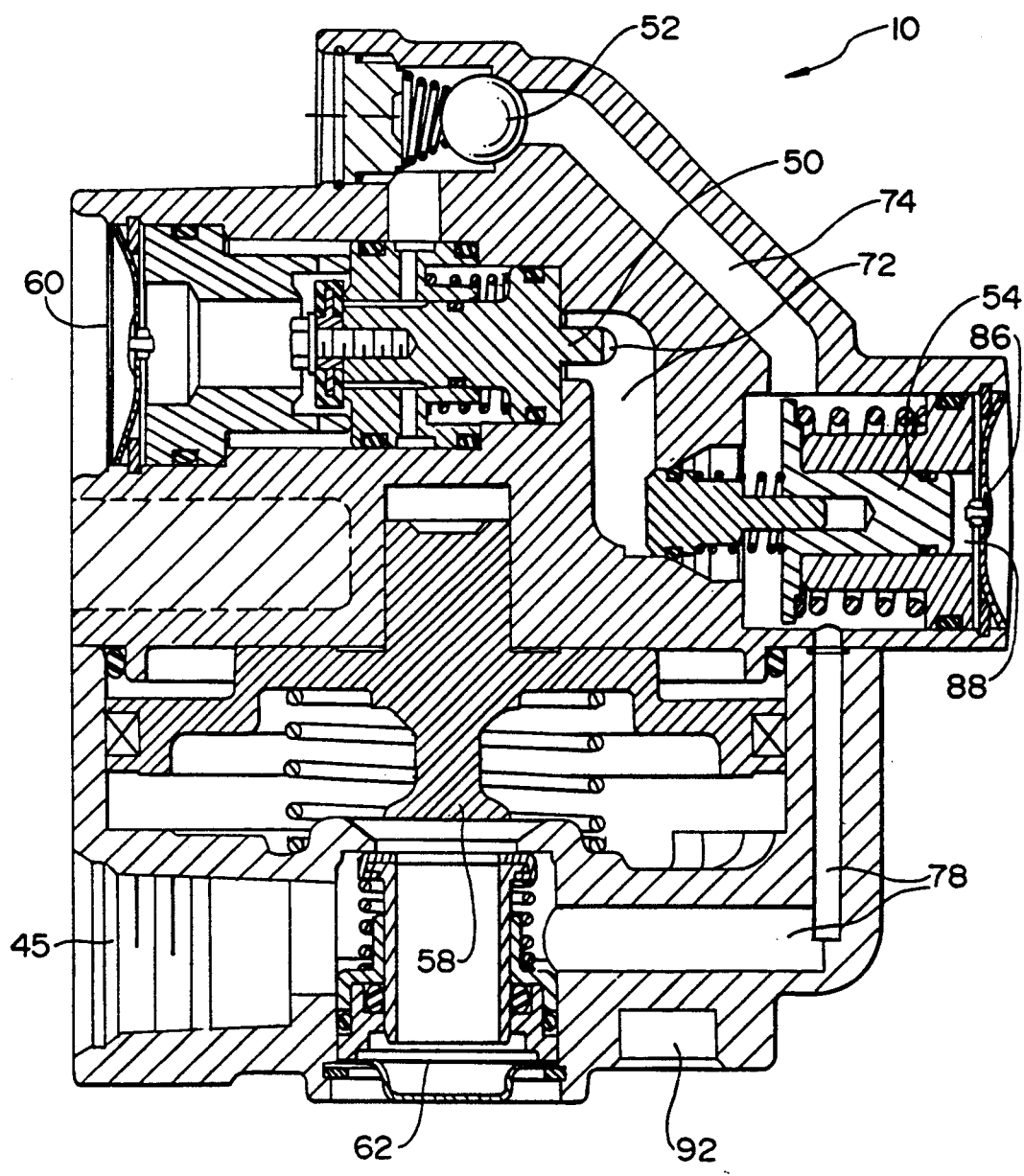

The perspective views of the preferred embodiment of FIGS. 3 and 4 serve to illustrate the compactness of the unitary design. Referring to FIG. 3, the overall height of the actual full-function valve depicted is approximately 6", the overall length (lower left to upper right of FIG. 3) is about 5½ and the overall width (upper left to lower right) is approximately 4½".

Consistent with the tandem brake system schematic of FIG. 1, the actual embodiment of FIGS. 3–4 has one port 42 for supply air, one port 44 for control air, two delivery ports 46 for the spring brake chambers and four delivery ports 48 for the service brake chambers. FIG. 3 also shows the exhaust port 60 for the spring brake valve module 50, port 45 to which the reservoir is connected, and breather aperture 86 for maintaining atmospheric pressure opposite the piston of pressure protection valve module 54, as depicted in FIGS. 5A–5F. The presence of breather aperture 86 results in pressure protection valve 54 remaining open while check valve 56 is closed under the conditions depicted in FIG. 2F and its counterpart FIG. 5F.

FIG. 3 also shows a non-functioning sealed access port 90 and FIG. 4 shows a non-functioning sealed port 92 for possible future embodiments. Neither contribute to the functioning of the present preferred embodiment of the invention and need not be discussed further.

The section views 5A–F, which are taken along the line 5—5 of FIG. 3, show the essentials of the valve. These include spring brake valve module 50 and associated one-way check valve 52, biased one-way pressure protection valve module 54 with associated one-way check valve 56 and relay module 58 which, as previously indicated, may be of conventional design readily understood by those skilled in the art without further amplification.

The springs associated with spring brake valve module 50 and pressure protection valve module 54 in association with the piston areas exposed to the pressurized air in passageways 72 provide the aforementioned first predetermined pressure, typically about 40 psig, and second predetermined pressure, typically 70 psig. In this latter regard, and as already indicated, the aforementioned aperture 86 is provided so that atmospheric pressure is maintained in the space 88 behind the piston of pressure protection valve module 54 despite the movement thereof.

Figure 6:
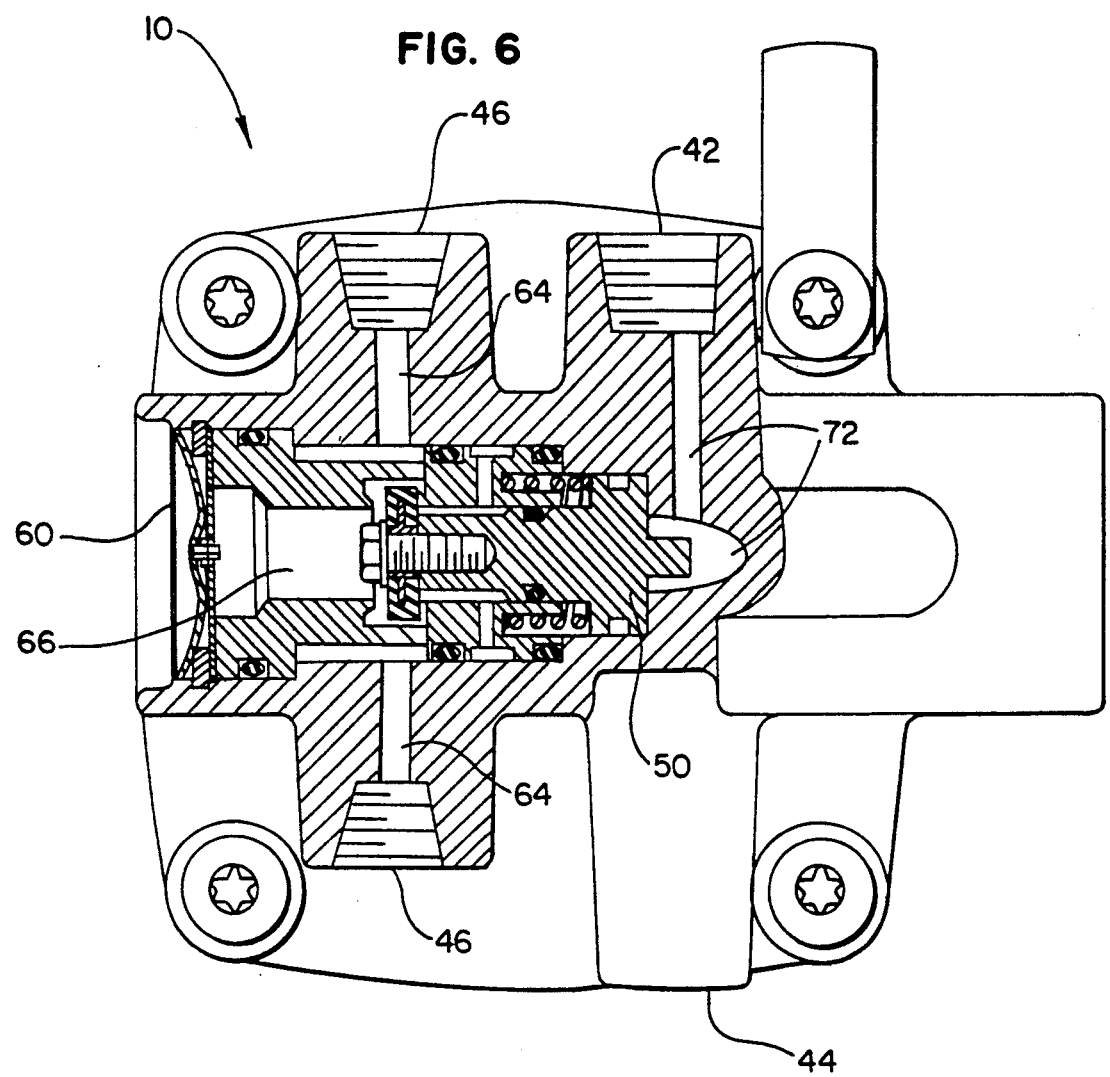
FIG. 6 is a cross-sectional view taken on section line 6—6 of FIG. 3 and shows communicating passageways not otherwise depicted in FIGS. 5A-5F.
Figure 7:
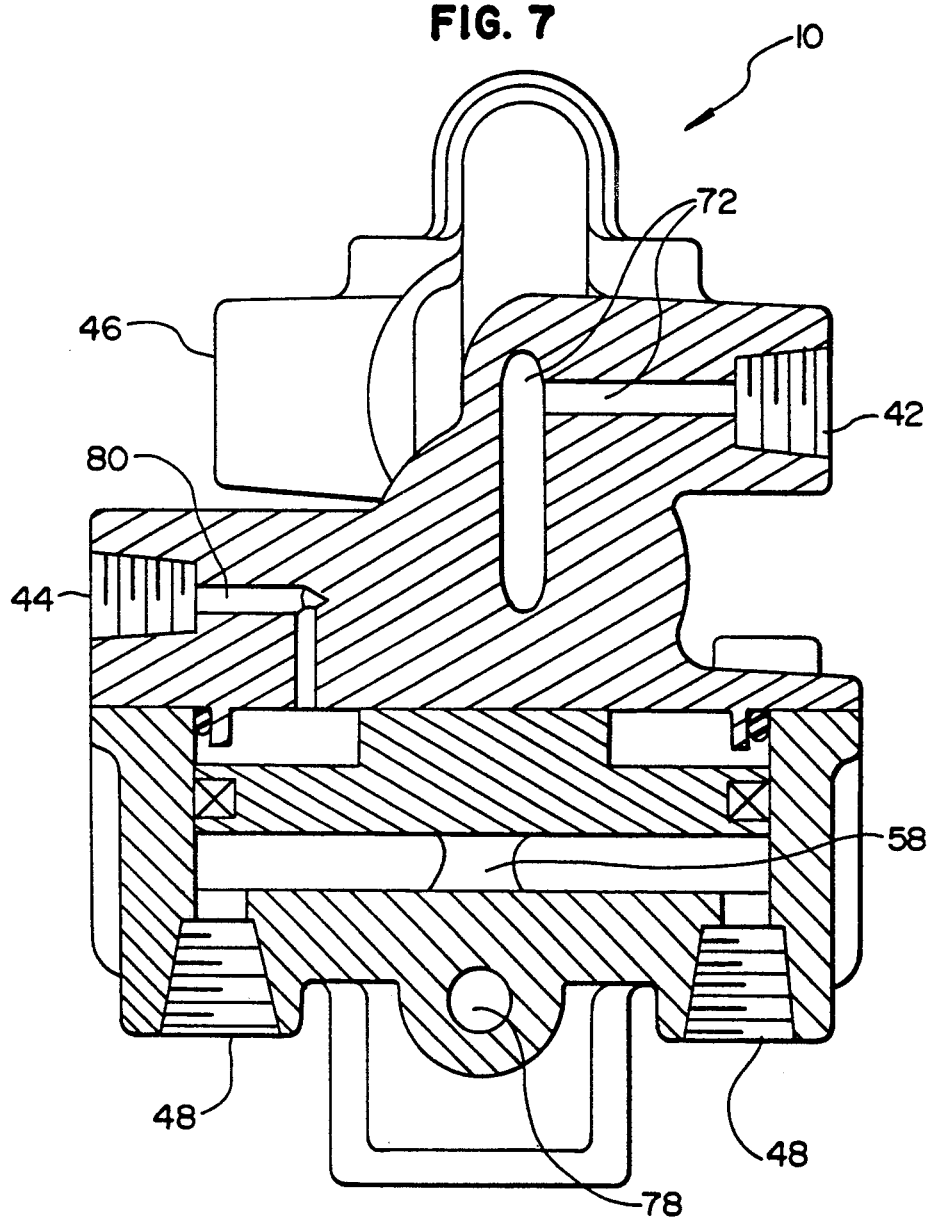
FIG. 7 is a cross-sectional view taken along the section line 7—7 of FIG. 4 and shows still other communicating passageways not otherwise depicted in FIGS. 5A-5F.

As shown by section lines 6—6 and 7—7 of FIGS. 3 and 4, the section views of 6 and 7, respectively, are taken on different planes than that of FIGS. 5A–5F. They show internal passageways which are not depicted or apparent in the section view of FIGS. 5A–5F. Specifically, FIG. 6 shows the passageways 64 from the spring brake control module 50 to ports 46 and the passageway 66 from the spring brake control module to exhaust port 60. FIG. 6 also shows the passageways 72 from the supply port 42. Similarly, FIG. 7 again shows from a different angle the passageways 72 from supply port 42, and also the passageways from the relay control module 58 to the ports 48 which are connected to the service brake chambers.

Since the positions of the internal components of FIGS. 5A–5F correspond to the functional modes already depicted and described in connection with the schematic presentation of FIGS. 2A–2F, those skilled in the art will readily recognize and understand the operation of the actual embodiment. This is apparent from a side-by-side comparison of FIGS. 2A–2F and 5A–5F, respectively.

Optional Anti-Compounding Embodiment

Figure 8:
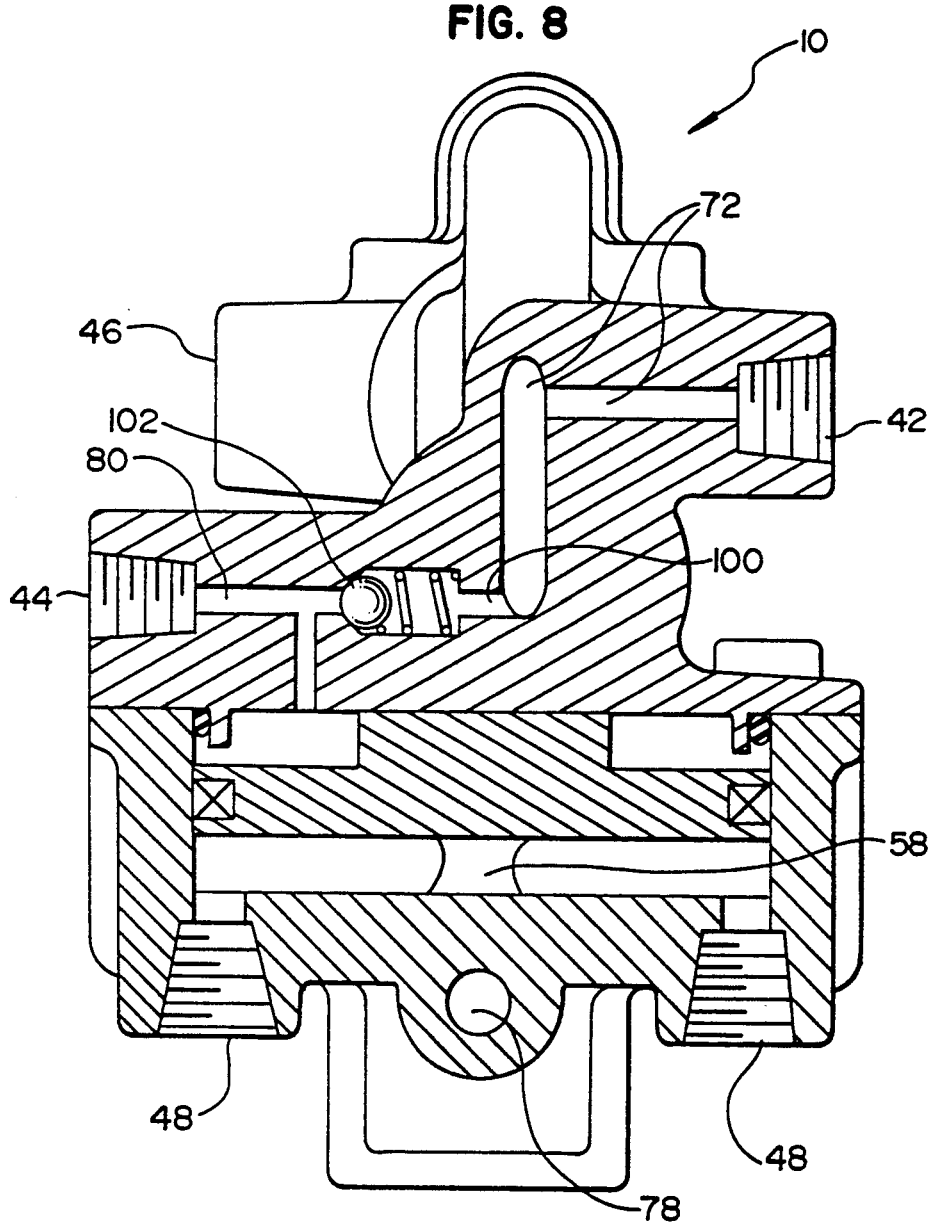
FIG. 8 is similar to FIG. 7 except that it incorporates the optional embodiment having an internal anti-compounding brake force protection feature.
Figure 9:
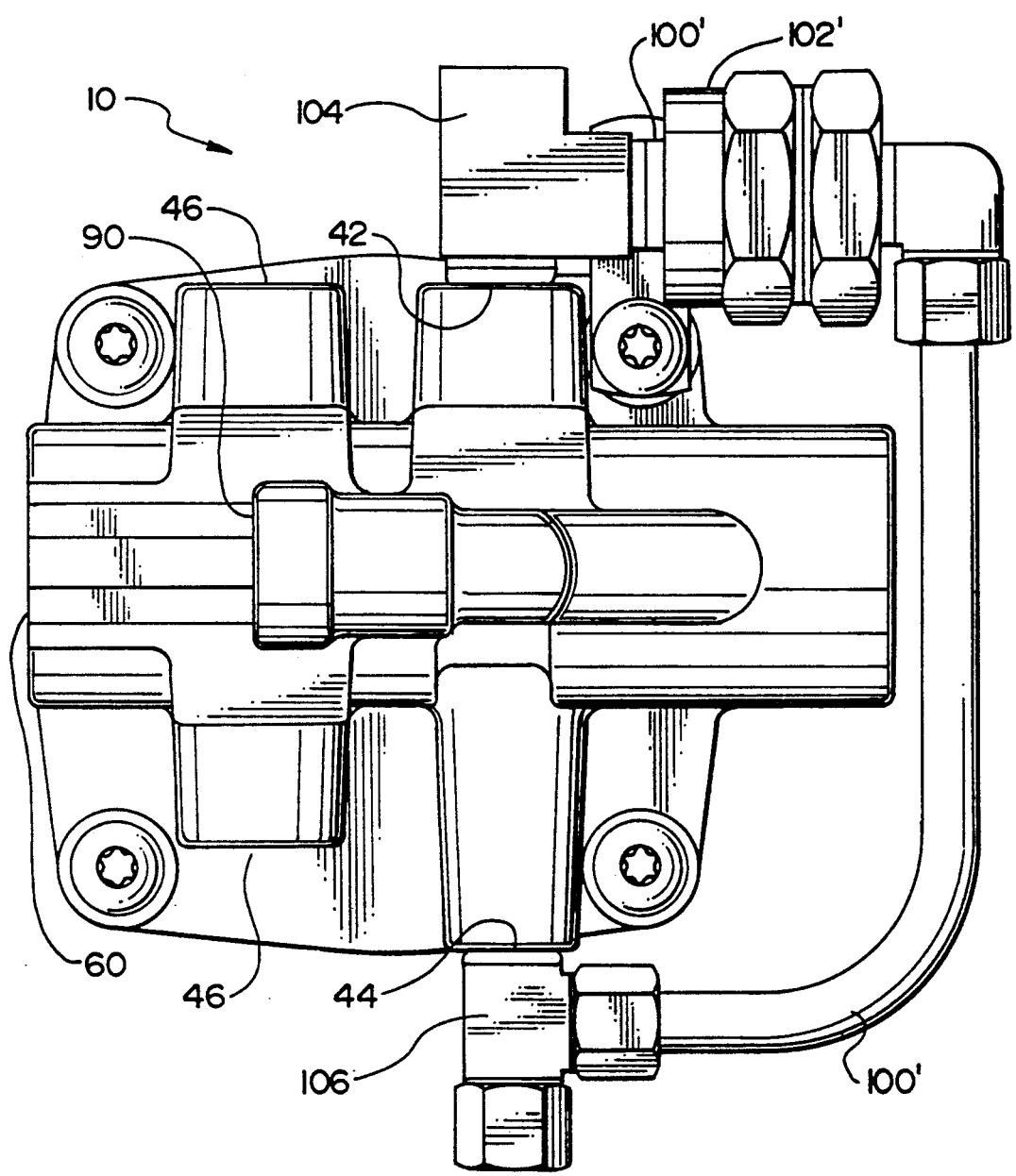
FIG. 9 is similar to FIG. 3 except that it is an overhead plan view to which has been added the optional embodiment having an external anti-compounding brake force protection feature.

FIGS. 2A and 8–9

The anti-compounding feature or circuit of the full-function valve, that is, passage 100 and check valve 102, or, alternatively, passageway 100[1] and check valve 102[1], is depicted in FIG. 2A, this feature being optional. While it is shown as an internal feature (solid lines), it can also be an add-on externally (dashed lines) by simply adding T-connections at ports 42 and 44 and running an external line therebetween with a one-way check valve, as discussed further hereinafter.

The anti-compounding feature copes with the problem arising when pressure in the supply line drops low enough, e.g., substantially below about 40 psig, e.g., 0 psig, to cause incipient application of the spring brakes while at the same time the pressure of control air is normal, or at least substantially higher. Such situation could result in both spring brakes forces and service brake forces being applied simultaneously. Such compounding of brake forces can cause damage and related dangerous brake action or lack thereof.

Referring to FIG. 2A, the presence of line 100 and check valve 102, or alternatively line 100[1] and check valve 102[1], in effect connecting control air and supply air when the pressure of supply air incipiently drops below that of the control air, remedies the situation. As soon as supply air pressure drops significantly below control air pressure, one-way check valve 102 opens, equalizing or balancing the pressure, usually by raising supply line pressure. This prevents application of the spring brake forces and compounding of the spring and service brake forces. A significant differential in pressure is one sufficient to overcome the force of the retaining spring normally holding the ball of the one-way valve in place and may be as little as 1 psi or less.

Referring to FIG. 8, normal pressure at port 80 and passageway 80 and zero pressure at port 42 and passageways 72 would cause one-way check valve 102 in passageway 100 to open and cause pressure equalization. If the result of such equalization is a rise in pressure in passageway 72 to the level of the control air, the spring brakes would be released and no compounding of brake forces would result when the service brakes are applied.

If, however, the opening of check valve 102 causes exhaustion of the control air, the spring brake forces would remain applied but the service brakes could not be applied. Again, no undesired compounding of brake forces would result.

This same anti-compounding protection can be obtained with the valve of the present invention by coupling ports 42 and 44 together using external passageways 100[1] and a one-way check valve 102[1], as illustrated in FIG. 9. Functionally, the external arrangement is the same as the internal arrangement.

The piping arrangement shown in the embodiment of FIG. 9, including T-shaped couplings 104 and 106 in ports 42 and 44 respectively, increases the maximum overall dimension of full-function valve 10 to only about 6.9". A particular advantage of the external embodiment of FIG. 9 is the fact that the basic all-function valve is so compact and the ports so close, very little external piping is necessary. Moreover, the external circuit can be readily added or disconnected, depending upon whether the anti-compounding feature is desired, the full-function valve otherwise remaining the same.

Recapitulation of Operation

ALL FIGS

Supply air enters valve 10 via line 14, port 42 and the chamber formed by passageways 72. Air pressure will begin to rise in this chamber, to the point at which it causes the spring brake control module 50 to shift at about 40 psig, and the pressure protection valve module 54 to open at about 70 psig. Shifting of the spring brake control module 50 will allow pressurized air to enter the spring brake chamber 22. The pressurized air entering the spring brake chambers 50 will be from either reservoir 16 of the trailer, if there is pressurized air present, or from the supply port 42 via pressure protection valve module 54 and 56, or both. As a result of this arrangement, pressurized air cannot go directly from the supply line 14 into the spring brake chambers 22. This forecloses the possibility of the trailer being moved without service brake capability, a critical safety feature.

As indicated, air in the supply line 10 must reach a certain pressure, e.g., about 70 psig, before it can open the pressure protection valve module 54. Once the module is opened, the pressurized air then can fill the air reservoir 16 of the trailer and the spring brake chambers 22, assuming that the spring brake chambers have not already been filled by pressurized air currently in the reservoir. While the pressure protection valve module 54 is set at about 70 psig, this actuation pressure can be changed, if necessary, to meet any changing requirements of governmental regulations, optimum operations, or the like.

Service brakes can now be applied through the operation of the four-port relay valve module 58. Control air signals from the tractor enter relay valve module 58 and act on the piston in a conventional manner. The piston actuates the valve module, allowing air from reservoir 16 to fill the service brake chambers 32 of the brake actuators 20, resulting in brake application through conventional mechanical means.

When supply line pressure is removed by means on the tractor or by disconnecting the trailer gladhand connection 12 or otherwise, the spring brake control module 50 will not shift to its original position until the supply line pressure decays below about 40 psig. The rate of pressure decay before shifting can be adjusted to meet requirements. This arrangement prevents non-intentional spring brake engagement during the normal cycling of the service brakes and fluctuations in the service air reservoir.

At a pressure in passageways 72 below about 40 psig, however, module 50 shifts and pressurized air in the spring brake chambers 22 commences venting to atmosphere and the spring brakes begin to apply braking force. When all of the air is removed, the spring brakes apply their full force. With the optional anti-compounding feature of FIGS. 2A and 8-9, the service brakes cannot be operated in this condition until pressurization in passageways 72 is increased to the point whereby the spring brakes are released.

In the event of a failure of air reservoir 16, the one-way check valve 52 will prevent the decay of air pressure in the spring brake chambers 22. This will allow the driver to pull the trailer off of the road using the tractor brakes for control prior to complete application of the spring brakes. The pressure protection valve module 54 will maintain a minimum air pressure of about 70 psig in the supply line, thus allowing the tractor to maintain service braking capacity.

As those skilled in the art will recognize, full-function valve 10 thus replaces three separate valves; yet provides the various braking functions necessary for the trailer. It also provides an anti-drive away feature, which prevents the trailer from moving prior to having adequate service brake capacity.

As is apparent from the above description, the full-function valve of the present invention copes with the operating and safety requirements of modern semi-trailers. It meets the requirements of present pertinent Federal Regulations and does so by advantageously integrating various valve functions within a single space-saving and cost-saving envelope or housing, thereby eliminating a complexity of multiple valves and interconnecting lines. The valve features fewer components, greater simplicity and lower repair, maintenance and inventory costs. Less complexity while still achieving the same performance enhances safety. Because functional components are largely concentrated within a single envelope or housing, trouble-shooting and remedial replacement are simplified. It otherwise achieves the various objects of the present invention as previously set forth.

It is to be understood that any allowed claims based on this application are to be accorded a range of equivalence commensurate in scope with the advance made over the prior art.

Having described the invention, what is claimed is:

1. A unitary full-function valve capable of meeting the emergency and service requirements of a tandem axle air brake system comprising a full-function valve body with multiple ports, including individual ports for fluid communication to spring brake chambers, to service brake chambers, to reservoir means and to exhaust; and for receiving pressurized control and supply air from respect thereof; said ports and related passageways within said valve body being disposed so as to communicate the control air for service brake control, and the supply air to and from the reservoir means, to and from the spring brake and service brake chambers of the air brake system, and to exhaust, the communications being selectively responsive to the positions of a plurality of valve modules within said full-function valve body, the supply air being communicated to the spring brake chambers only when supply air is also communicated to the reservoir means.

2. The unitary full-function valve of claim 1 wherein said plurality of valve modules comprises:
   (a) a spring brake valve module within said full-function valve body providing (i) fluid communication from spring brake ports of said valve body to exhaust ports when air pressure at the supply port is less than a first predetermined pressure, and (ii) fluid communication from the reservoir portion of said valve body to the spring brake ports when the air pressure at the supply port is at or higher than said first predetermined pressure;
   (b) a relay valve module within said full-function valve body for selectively employing supply air to actuate the service brakes responsive to control air signals received at the control port of said valve body; and
   (c) a biased one-way pressure protection valve module within said full-function valve body providing fluid communication from the supply port to the reservoir port, to the spring brake valve module and to the relay valve module at or above a second higher predetermined air pressure at the supply port.

3. The unitary full-function valve of claim 2 wherein said spring brake valve module has a one-way check valve associated therewith whereby fluid communication from the reservoir port to the spring brake ports is one-way.

4. The unitary full-function valve of claim 2 wherein said relay valve module (i) in a first mode provides fluid communication between the service brake ports of said full-function valve body and an exhaust port in response to decreasing pressure or zero pressure at said control port; (ii) in a second mode provides one-way fluid communication from said supply port and fluid communication from said reservoir port to said service brake ports in response to increasing pressure at said control port; and (iii) in a third mode blocks fluid communication to and from said service brake port in response to a stabilized elevated pressure at said control port.

5. The unitary full-function valve of claim 2 wherein said biased one-way pressure protection valve has a consistently-disposed unbiased one-way check valve associated therewith.

6. The unitary full-function valve of claim 2 wherein fluid communication is established between the supply air and control air port whenever the pressure at the supply port is significantly less than the pressure at the control port whereby compounding of spring brake and service brake forces is avoided.

7. The unitary full-function valve of claim 6 wherein said fluid communication between the supply air and control air ports is provided by one-way check valve means and passageways internal to said valve body.

8. The unitary full-function valve of claim 6 wherein said fluid communication between the supply air and control air ports is provided by one-way check valve means and passageways external to said valve body.

9. A unitary full-function valve capable of meeting the emergency and service requirements of a tandem axle air brake system comprising a full-function valve body with multiple ports, including individual ports for fluid communication to spring brake chambers, to service brake chambers, to reservoir means and to exhaust; and for receiving pressurized control and supply air from respective sources thereof; said ports and related passageways within said valve body being disposed so as to communicate the control air for service brake control, and the supply air to and from the reservoir means, to and from the spring brake and service brake chambers of the air brake system, and to exhaust, the communications being selectively responsive to the positions of a plurality of valve modules within said full-function valve body; the supply air being communicated to the spring brake chambers only when supply air is also communicated to the reservoir means; said plurality of valve modules comprising:

(a) a spring brake valve module within said full-function valve body providing (i) fluid communication from spring brake ports of said valve body to exhaust ports when air pressure at the supply port is less than a first predetermined pressure, and (ii) fluid communication from the reservoir port of said valve body to the spring brake ports when the air pressure at the supply port is at or higher than said first predetermined pressure;

(b) a relay valve module within said full-function valve body for selectively employing supply air to actuate the service brakes responsive to control air signals received at the control port of said valve body; and (c) a biased one-way pressure protection valve module within said full-function valve body providing fluid communication from the supply port to the reservoir port, to the spring brake valve module and to the relay valve module at or above a second higher predetermined air pressure at the supply port.

10. The unitary full-function valve of claim 9 wherein said spring brake valve module has a one-way check valve associated therewith whereby fluid communication from the reservoir port to the spring brake ports is one-way.

11. The unitary full-function valve of claim 9 wherein said relay valve module (i) in a first mode provides fluid communication between the service brake ports of said full-function valve body and an exhaust port in response to decreasing pressure and zero pressure at said control port; (ii) in a second mode provides one-way fluid communication from said supply port and fluid communication from said reservoir port to said service brake ports in response to increasing pressure at said control port; and (iii) in a third mode blocks fluid communication to and from said service brake port in response to a stabilized elevated pressure at said control port.

12. The unitary full-function valve of claim 9 wherein said biased one-way pressure protection valve has a consistently-disposed unbiased one-way check valve associated therewith.

13. The unitary full-function valve of claim 9 wherein fluid communication is established between the supply air and control air port whenever the pressure at the supply port is significantly less than the pressure at the control port whereby compounding of spring brake and service brake forces is avoided.

14. A unitary full-function valve capable of meeting the emergency and service requirements of a tandem axle air brake system comprising a full-function valve body with multiple ports, including individual ports for fluid communication to spring brake chambers, to service brake chambers, to reservoir means and to exhaust; and for receiving pressurized control and supply air from respective sources thereof; said ports and related passageways within said valve body being disposed so as to communicate the control air for service brake control, and the supply air to and from the reservoir means, to and from the spring brake and service brake chambers of the air brake system, and to exhaust, the communications being selectively responsive to the positions of a plurality of valve modules within said full-function valve body; the supply air being communicated to the spring brake chambers only when supply air is also communicated to the reservoir means; said plurality of valve modules comprising:

(a) a spring brake valve module within said full-function valve body providing (i) fluid communication from spring brake ports of said valve body to exhaust ports when air pressure at the supply port is less than a first predetermined pressure, and (ii) fluid communication from the reservoir port of said valve body to the spring brake ports when the air pressure at the supply port is at or higher than said first predetermined pressure; said spring brake valve module having a one-way check valve associated therewith whereby fluid communication from the reservoir port to the spring brake ports is one-way;

(b) a relay valve module within said full-function valve body for selectively employing supply air to actuate the service brakes responsive to control air signals received at the control port of said valve body; said relay valve module (i) in a first mode providing fluid communication between the service brake ports of said full-function valve body and an exhaust port in response to decreasing pressure and zero pressure at said control port; (ii) in a second mode providing one-way fluid communication from said supply port and fluid communication from said reservoir port to said service brake ports in response to increasing pressure at said control port; and (iii) in a third mode blocking fluid communication to and from said service brake port in response to a stabilized elevated pressure at said control port; and (c) a biased one-way pressure protection valve module within said full-function valve body providing fluid communication from the supply port to the reservoir port, to the spring brake valve module and to the relay valve module at or above a second higher predetermined air pressure at the supply port; said biased one-way pressure protection valve having a consistently-disposed unbiased one-way check valve associated therewith.

15. The unitary full-function valve of claim 14 wherein fluid communication is established between the supply air and control air port whenever the pressure at the supply port is significantly less than the pressure at the control port whereby compounding of spring brake and service brake forces is avoided.

* * * * *

UNITED STATES PATENT AND TRADEMARK OFFICE
CERTIFICATE OF CORRECTION

PATENT NO. : 5,236,250
DATED : August 17, 1993
INVENTOR(S) : MICHAEL J. MOODY, ROBERT L. KOELZER It is certified that error appears in the above-identified patent and that said Letters Patent is hereby corrected as shown below:

Column 2, line 18, "4,472,007" should read
--4,472,001--.

Column 2, line 42, after "maintain" add a period.

Column 3, line 11, after "pressure" insert
--for--.

Column 3, line 13, after "invention" insert
--will--.

Column 3, line 44, after "pressure" add a period.

Column 4, line 41, after "2C," insert
--2D,--. change "2E" (first occ.) to --2D--.

line 41, delete "2E", first (occ.).
Column 11, line 61, "respect" should read--respective sources--.

Signed and Sealed this

Fifth Day of April, 1994

Attest:

BRUCE LEHMAN

Attesting Officer     Commissioner of Patents and Trademarks